(12) United States Patent
Choudhury

(10) Patent No.: US 12,135,595 B2
(45) Date of Patent: *Nov. 5, 2024

(54) SYSTEMS AND METHODS FOR PROVIDING BACK-UP POWER TO A PROCESSOR USING AN UN-INTERRUPTIBLE POWER SUPPLY

(71) Applicant: Florence Corporation, Manhattan, KS (US)

(72) Inventor: Maroof Choudhury, Pembroke Pines, FL (US)

(73) Assignee: Florence Corporation, Manhattan, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,388

(22) Filed: Apr. 7, 2023

(65) Prior Publication Data

US 2023/0244290 A1 Aug. 3, 2023

Related U.S. Application Data

(63) Continuation of application No. 16/943,397, filed on Jul. 30, 2020, now Pat. No. 11,650,646.

(51) Int. Cl.
  *G06F 1/30* (2006.01)
  *H02J 7/00* (2006.01)
  *H02J 7/34* (2006.01)
  *H02J 9/06* (2006.01)

(52) U.S. Cl.
  CPC .............. *G06F 1/30* (2013.01); *H02J 7/0068* (2013.01); *H02J 7/345* (2013.01); *H02J 9/061* (2013.01)

(58) Field of Classification Search
  None
  See application file for complete search history.

(56) References Cited

U.S. PATENT DOCUMENTS

| 9,508,399 | B1 | 11/2016 | Bottemiller et al. |
| 2004/0262132 | A1 | 12/2004 | Pauley et al. |
| 2014/0145695 | A1 | 5/2014 | Riedel et al. |
| 2015/0042295 | A1 | 2/2015 | Cowley et al. |
| 2016/0352144 | A1 | 12/2016 | Shelton et al. |
| 2017/0315817 | A1 | 11/2017 | Pritchard |

(Continued)

OTHER PUBLICATIONS

Analog Devices, Inc., "LTC 404041: 2.5A Supercapacitor Backup Power Manager," product brochure, 26 pp.

*Primary Examiner* — Danny Chan
(74) *Attorney, Agent, or Firm* — Leydig, Voit & Mayer, Ltd.

(57) ABSTRACT

A system comprising a power source, a RASPBERRY PI Hardware Attached on Top (RPI HAT) with an Uninterruptable Power Supply (UPS), and a RASPBERRY PI (RPI) is provided. The power source provides power to the RPI via the RPI HAT. The RPI HAT comprises a super-capacitor (SC) back-up system comprising an SC power bank and compatibility circuitry configured to charge the SC power bank to a sufficient level such that the SC power bank is usable as a back-up power supply in response to the loss of power from the power source. The SC back-up system is electrically coupled to the power source such that the power source is capable of charging the SC power bank and the SC power bank discharges and provides power to the RPI in response to a loss of power from the power source to the RPI.

15 Claims, 8 Drawing Sheets

(56) References Cited

U.S. PATENT DOCUMENTS

2018/0181184 A1* 6/2018 Ye .............................. H02J 9/04
2019/0311607 A1   10/2019 Pop
2020/0141992 A1    5/2020 Goeritz
2021/0013735 A1    1/2021 Pachoud et al.

* cited by examiner

SYSTEMS AND METHODS FOR PROVIDING BACK-UP POWER TO A PROCESSOR USING AN UN-INTERRUPTIBLE POWER SUPPLY

CROSS REFERENCE TO RELATED APPLICATIONS

This application claims the benefit of, and priority to, U.S. patent application Ser. No. 16/943,397 (filed Jul. 30, 2020), which is incorporated herein by reference in its entirety.

FIELD

The present disclosure relates to a hardware attached on top (HAT) that is compatible with a processor (e.g., RASPBERRY PI (RPI) processor) and uses a super-capacitor (SC) to provide back-up power to the processor in the event of an unexpected power loss.

BACKGROUND

A processor such as the RASPBERRY PI (RPI) processor may be operatively coupled to a power source or power supply. The power supply may provide power to the RPI processor and when powered on, the RPI processor may perform certain functions or operations. The power supply may provide a steady direct current (DC) voltage (e.g., 5 volts (V)) to the RPI processor. However, in some instances, there may be an unexpected power source interruption that causes the RPI processor to lose power. For example, the unexpected power source interruption may be intermittent (e.g., the power loss may be temporary) or may be permanent. In either instance, the RPI processor might not have the opportunity to shut down properly, which may cause data to be lost and operations or functions to fail. Accordingly, there remains a technical need for a reliable back-up power supply to supply back-up power to the RPI processor in the event of an unexpected power loss.

SUMMARY

A first aspect of the present disclosure a system comprising a power source, a RASPBERRY PI Hardware Attached on Top (RPI HAT) with an Uninterruptable Power Supply (UPS) operatively coupled to the power source and a RASPBERRY PI (RPI), and the RPI operatively coupled to the RPI HAT. The power source provides power to the RPI via the RPI HAT. The RPI HAT comprises a super-capacitor (SC) back-up system comprising an SC power bank and compatibility circuitry configured to charge the SC power bank to a sufficient level such that the SC power bank is usable as a back-up power supply in response to the loss of power from the power source. The SC back-up system is electrically coupled to the power source such that the power source is capable of charging the SC power bank and the SC power bank discharges and provides power to the RPI in response to a loss of power from the power source to the RPI.

A second aspect of the present disclosure provides a RASPBERRY PI Hardware Attached on Top (RPI HAT) with an Uninterruptable Power Supply (UPS). The RPI HAT comprises a super-capacitor (SC) back-up system comprising an SC power bank and a delay circuit operatively coupled to the SC back-up system and the RPI such that the delay circuit monitors a charge of the SC power bank and delays the power source from providing power to the RPI to initiate a Boot-Up Sequence of the RPI until the charge of the SC power bank is above a first threshold. The SC back-up system is electrically coupled to a power source such that the power source is capable of charging the SC power bank and the SC power bank discharges and provides power to an RPI in response to a loss of power from the power source to the RPI.

A third aspect of the present disclosure provides a RASPBERRY PI (RPI) comprising one or more central processing units (CPUs) and a non-transitory computer-readable medium having processor-executable instructions stored thereon, wherein the processor-executable instructions, when executed, facilitate: receiving power from a power source based on a capacitor full (CAPF) signal indicating a charge of an SC power bank of a RASPBERRY PI Hardware Attached on Top (RPI HAT) is at or above a first threshold, wherein the RPI HAT comprises a delay circuit that delays a power source from providing power to the RPI until the charge of the SC power bank is at or above the first threshold; based on receiving the power from the power source, initiating a start-up sequence for the RPI, wherein the start-up sequence comprises providing an override signal to the RPI HAT, wherein the override signal overrides the CAPF signal; receiving, from the RPI HAT, one or more unexpected power loss signals indicating a power loss from the power source; and initiating a safe shut-down sequence based on the one or more unexpected power loss signals.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
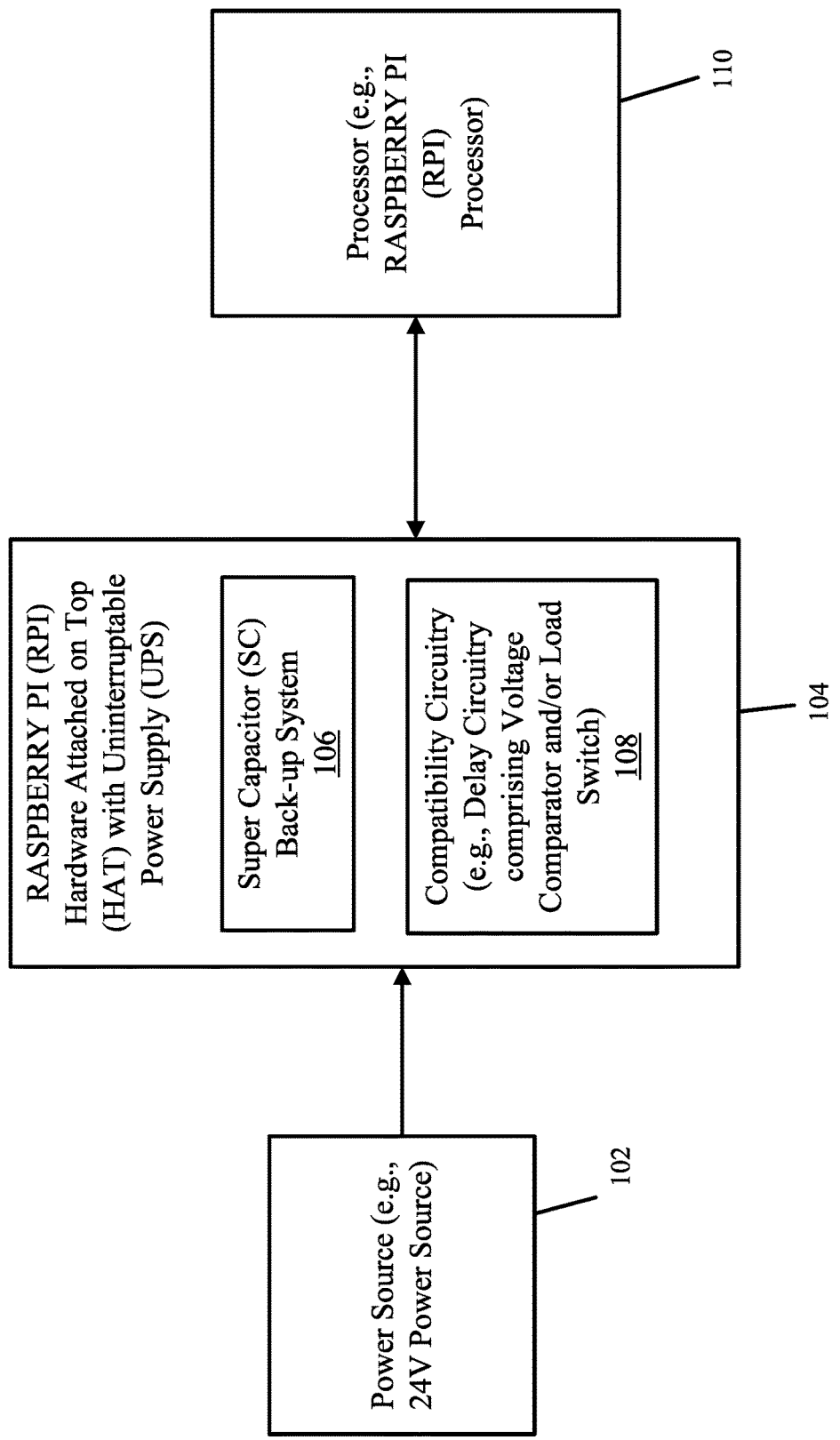
FIG. 1 illustrates a simplified block diagram depicting a back-up power supply system for a RASPBERRY PI (RPI) processor according to one or more embodiments of the present disclosure.

Exemplary aspects of a RASPBERRY PI (RPI) Hardware Attached on Top (HAT) that is used to provide back-up power to an RPI processor, according to the present disclosure, are further elucidated below in connection with exemplary embodiments, as depicted in the figures. The exemplary embodiments illustrate some implementations of the present disclosure and are not intended to limit the scope of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

FIG. 1 illustrates a simplified block diagram depicting a back-up power supply system 100 for a RASPBERRY PI (RPI) processor 110 according to one or more embodiments of the present disclosure.

Referring to FIG. 1, the back-up power supply system 100 includes a power source 102 (e.g., a 24 volt (V) power source), a RASPBERRY PI (RPI) hardware attached on top (HAT) with an uninterruptable power supply (UPS) 104, and a processor 110 (e.g., an RPI processor). The RPI HAT with UPS includes a super capacitor (SC) back-up system 106 and a compatibility circuitry 108. The compatibility circuitry 108 may include, for example, delay circuitry such as a voltage comparator and/or a load switch.

The RPI processor 110 is a computer, computing device, controller, and/or processor used as a small single-board computer to perform functions, tasks, and/or operations. The RPI processor 110 may include one or more central processing units (CPUs) and/or additional processing units. Additionally, the RPI processor 110 may include memory such as a non-transitory computer-readable medium. The memory may include processor-executable instructions that when executed by the CPUs perform one or more functions described herein.

In operation, the power source 102 provides power for operating the RPI processor 110. The power supply 122 is electrically coupled to the RPI processor 110 via the RPI HAT 104. For example, the power source 102 may be a 24V power source and provide 24V to the RPI HAT 104. The RPI HAT 104 converts the 24V to a voltage that is usable by the RPI processor 110. For instance, the RPI HAT 104 may include a voltage converter that converts the 24V from the power source 102 into another voltage such as 5V. The RPI HAT 104 may provide the 5V to the RPI processor 110. In some instances, the power source 102 may have a power failure and/or another event that causes a loss of power. The event that causes the loss of power may be any event that prevents the power source 102 from providing power to the RPI processor 110. In such instances, the RPI HAT 104 may use a back-up power supply such as the SC back-up system 106 to provide back-up power to the RPI processor 110.

In other words, in the event of a power loss or failure (e.g., the power source 102 ceases or is prevented from providing power to the RPI processor 110), the SC back-up system 106 provides power to the RPI processor 110. For example, the SC back-up system 106 may include one or more super capacitors (SC) such as an SC power bank. In addition to the power source 102 providing power to the RPI processor 110 via the RPI HAT 104, the power source 102 may also provide power to the one or more SCs to charge the SCs. Then, in the event of a power loss, the SCs of the SC back-up system 106 may be used as a back-up power supply to supply power to the RPI processor 110.

For instance, without the SC back-up system 106 or any other type of back-up power supply and in the event of a power loss or power failure, the RPI processor 110 may unexpectedly shut down, which may cause a loss of data and/or failure to complete certain tasks or functions. By using the SC back-up system 106, the SC back-up system 106 either bridges a gap until the power source 102 is able to provide power to the RPI processor 110 again and/or safely shut down the RPI processor 110 to prevent the loss of data/failure to complete certain tasks or functions. For instance, the event of the power loss or power failure may be intermittent (e.g., only for a brief period of time) or may last for a substantial amount of time. If the power loss/power failure is intermittent, the SC back-up system 106 provides back-up power to the RPI processor 110 such that the RPI processor 110 can continue normal and/or slightly scaled back operation until the power loss/power failure is fixed and the power source 102 is able to provide power to the RPI processor 110. In the event the power loss/power failure is for a substantial amount of time such that the charge of the SC back-up system 106 is depleted and/or nearing depletion, the SC back-up system 106 provides enough back-up power so the RPI processor 110 is able to safely shut down.

The SC back-up system 106 may be any type of system that includes one or more SCs that are capable of providing back-up power to the RPI processor 110. In some examples, the SC back-up system 106 may further include additional integrated circuitry (IC). For example, the SC back-up system 106 may be the LTC 4041 integrated circuit that is produced by ANALOG DEVICES. In other words, the SC back-up system 106 such as the LTC 4041 circuit is known.

The LTC 4041 is an SC back-up power management system that operates using a supply voltage of up to 5.5V DC at the input. When powered from the power source 102, the LTC 4041 circuit operates in a charge mode that charges the SCs. In this state, the internal circuitry allows the SCs to charge. The LTC 4041 further includes a step-down capacitor charging circuit that uses pulse width modulation (PWM) to regulate the capacitor charge voltage to a set voltage. The charging circuit offers a method to limit the maximum charging current. The charge balancing circuit allows using two capacitors in series, distributing the charge equally to both capacitors.

The input terminal of the LTC 4041 may be monitored to detect a power failure (e.g., power loss/power failure event), at which point the power fail output (PFO) pin changes state to notify external circuitry of the event. When the power failure event is detected, the LTC 4041 operates in a backup mode. In this mode, the capacitors are discharged to power a buck/boost controller to maintain a set voltage at the output of the system 106, which is regulated by the PWM. The amount of time the buck/boost controller is able to maintain the desired output voltage to the RPI processor 110 depends on the capacitance value of the SCs, the set-point of the system voltage, and the amount of current drawn by the down-stream loads. The buck/boost controller may be disabled to prevent capacitor discharge by controlling the back/boost controller enable (BSTEN) pin. The output of the system 106 is electronically coupled to the RPI processor 110 used to power the RPI processor 110 during the charge and/or back-up modes. In some instances, the set-point for the buck/boost controller output may be set at 5.1V (e.g., an optimal output set-point) to supply power to the RPI processor 110.

Figure 2:
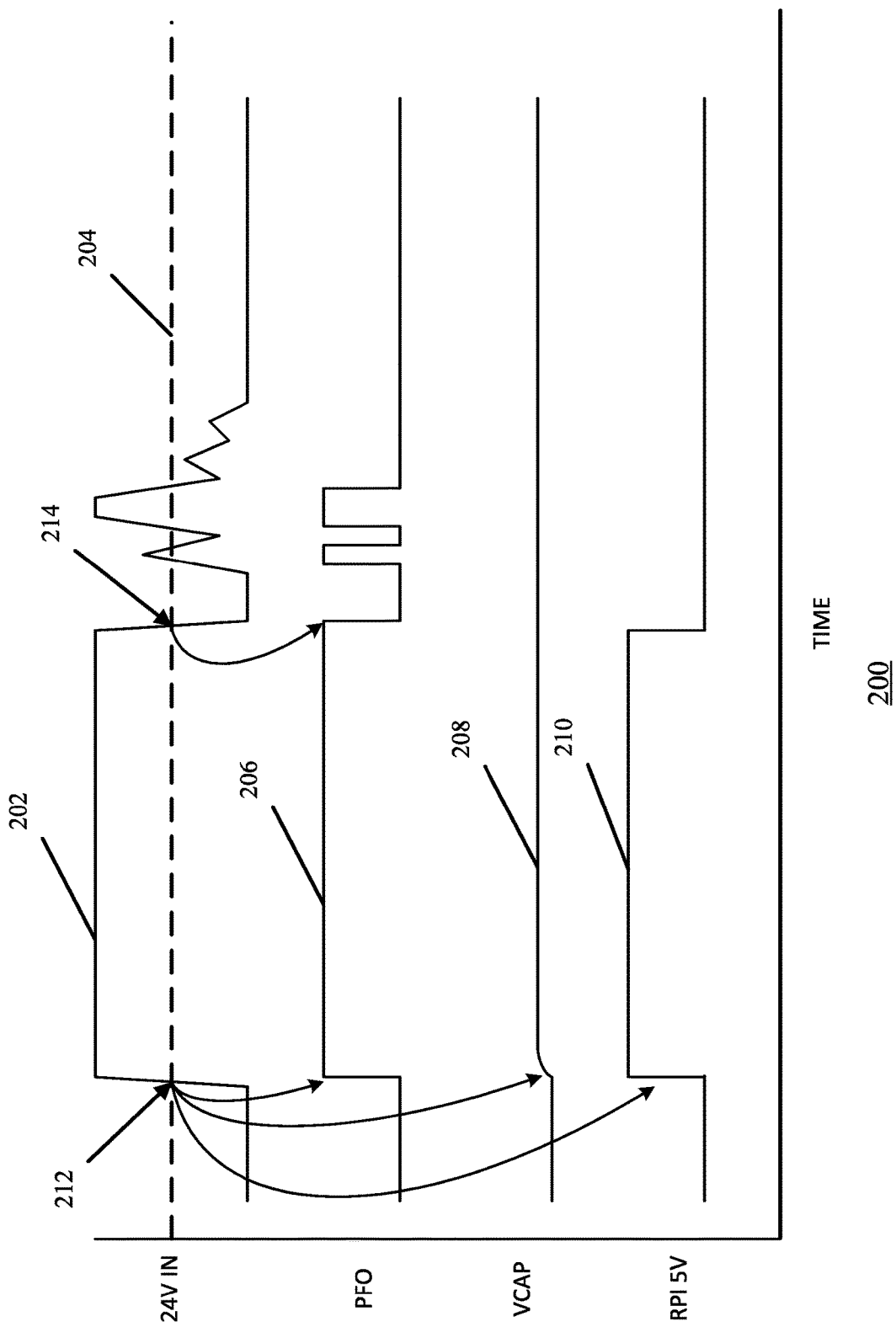
FIG. 2 illustrates a graphical representation of using a Super Capacitor (SC) Back-up System to provide a back-up power supply to the RPI processor according to one or more embodiments of the present disclosure.

FIG. 2 illustrates a graphical representation 200 of using a Super Capacitor (SC) Back-up System to provide a back-up power supply to the RPI processor 110 according to one or more embodiments of the present disclosure. For example, the graphical representation 200 depicts a plurality of detected electrical signals over a period of time for a system that includes a power source, an SC back-up system (e.g., LTC 4041), and an RPI processor.

As shown, signal 202 represents the signal coming from the power source (e.g., 24V IN signal). The line 204 represents a power fail threshold. When the 24V IN signal 202 is above the threshold 204, the power source is providing power to the RPI processor. However, when the 24V IN signal 202 is below the threshold 204, a power loss/power failure event is occurring (e.g., the power source is prevented from and/or ceases to provide power to the RPI processor).

Signal 206 represents the power fail output (PFO) signal. When the 24V IN signal 202 is above the threshold 204, the PFO signal 206 is high and when the 24V IN signal 202 is below the threshold 204, the PFO signal 206 is low. The signal 208 represents the detected voltage (VCAP) at the super capacitors (SCs) of the SC back-up system. The signal 210 represents the voltage/power received by the RPI processor.

As shown, at time 212, the power source provides a voltage (represented by the 24V IN signal 202) that is above the threshold 204. Therefore, the PFO signal 206, which may be binary), changes from low (e.g., 0) to high (e.g., 1). Also, at that time 212, the SCs of the SC back-up system begins charging as represented by VCAP signal 208 and power is being provided to the RPI processor as represented by the RPI 5V signal 210.

At time 214, a power failure or power loss event may occur as represented by the 24V IN signal 202 moving below the threshold 204. As such, the PFO signal 206 changes from high to low. In such instances, the SCs of the SC back-up system such as the LTC 4041 circuitry should provide back-up power to the RPI processor to permit the RPI processor to continue operation. However, as shown, the voltage of the SCs (VCAP signal 208) fails to reach a charge that is capable of providing back-up power to the RPI processor. Therefore, when the power source fails to provide power to the RPI processor due to a power failure/loss event at time 214, the RPI 5V signal 210 changes from high to low indicating that the RPI processor is unable to receive the power (e.g., 5V of power) necessary to remain operational.

In particular, it was noticed that if there was a significant down-stream load (e.g., the RPI processor and/or another load that pulls 1.2 Amps as a peak amount) in addition to the surge current of the SCs of the LTC 4041, the PWM circuit would become unstable. This caused instability in the feedback loop that regulates the SC voltage (indicated by the VCAP 208), which led to the Super-capacitor charging process to stall (e.g., fail to charge to a sufficient amount to be used as a back-up power supply). While the LTC4041 does feature a current limiting mechanism for the SCs and after attempting several current limiting margins, it was determined that the best method to mitigate this problem would be to include additional compatibility circuitry to permit the SC back-up system (e.g., LTC 4041) to be charged properly such that it is able to be used as a back-up power supply.

In other words, while SC back-up systems such as the LTC 4041 circuitry are known, a system that uses the SC back-up systems with an RPI processor 110 was not known previously. In addition, as shown in FIG. 2, it would not have been obvious to use an SC back-up system with the RPI processor 110 as the SCs of the back-up system would fail to charge properly and fail to provide a back-up power supply to the RPI processor in the event of a power loss/failure. Accordingly, as will be described below, the present application includes additional compatibility circuitry such as delay circuitry that permits the SCs of the back-up system to charge properly and provide power to the RPI processor in the event of the power loss/failure.

Referring back to FIG. 1, the RPI HAT 104 further includes compatibility circuitry 108. The compatibility circuitry 108 is any circuitry/integrated circuitry that enables the SC back-up system 106 to be used as a back-up power supply for the RPI processor 110 in the event of a power failure/loss from the power source 102. For example, the compatibility circuitry 108 may include and/or be one or more devices, chips, logic gates, and/or other electrical circuitry or component that enables the SC-backup system 106 to be used as a back-up power supply. In some instances, the compatibility circuitry 108 is and/or includes delay circuitry such as a voltage comparator and/or load switch. The delay circuitry may delay the initialization (e.g., start-up) of the RPI processor 110 such that the SCs from the SC back-up system 106 are able to be charged properly (e.g., to a sufficient level). By enabling the charging of the SCs, the compatibility circuitry 108 enables the SCs of the SC back-up system 106 to be used as a back-up power supply in the event the power source 102 is unable to provide power to the RPI processor 110 (e.g., in the event of a power loss/failure).

In some examples, the RPI HAT 104 and/or the compatibility circuitry 108 may be used with other devices, apparatuses, and/or processors that are not the RPI processor 110. In other words, the compatibility circuitry 108 may be used to enable compatibility between one or more SCs and a device, apparatus, and/or processor that is not an RPI processor such as an Advanced RISC machine (ARM) based processor and/or a type of a single board computer (SBC). For instance, the compatibility circuitry 108 and/or the RPI HAT 104 may be used to enable compatibility (e.g., charging of the SCs such that the SCs are able to be used as a back-up power supply, enabling a safe shut-down sequence for the processor, and/or perform other functions described herein) between one or more SCs and any type of SBC. A SBC may be a computer built on a single circuit board, with microprocessor(s), memory, input/output (I/O), and/or other features required of a functional computer. In some instances, the SBC may require a 5V supply voltage and may operate within the load capacity associated with the RPI HAT 104. For instance, the other processor (e.g., an SBC), in some examples, may pull or consume a peak load of up to 1.2 Amps (A). Based on this peak load, the SC back-up system 106 might not be able to charge the SCs properly and as such, the RPI HAT 104, including the compatibility circuitry 108, may be used to properly charge the SC back-up system 106 and/or perform other functions described herein such that the SC back-up system 106 is able to be used as a back-up power supply for the processor in the event of a power loss/failure.

Additionally, and/or alternatively, the compatibility circuitry 108 may include additional circuitry that provides feedback information (e.g., feedback signals) to the RPI processor 110. The RPI processor 110 may use the feedback signals (e.g., SC capacitor full signal (CAPF) and/or SC capacitor empty (CAPE)) to determine whether the power loss/failure is an intermittent power loss or may last for a substantial amount of time. Furthermore, the RPI processor 110 may determine, based on these feedback signals, whether to turn on or initialize the RPI processor 110 and/or whether to turn off (e.g., initialize a safety shutdown procedure) the RPI processor 110. This will be explained in further detail below.

Figure 3:
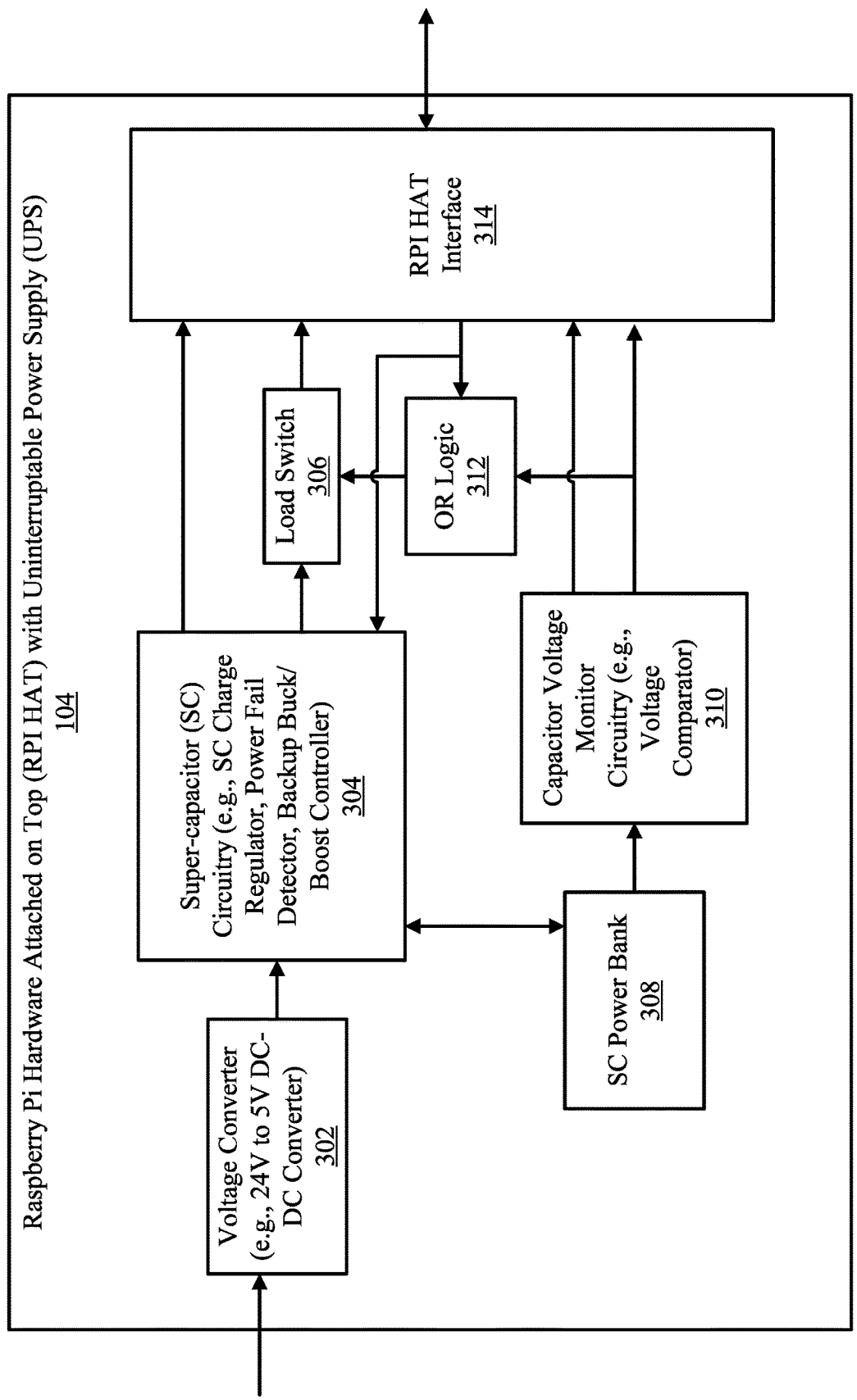
FIG. 3 illustrates a simplified block diagram depicting a RPI Hardware Attached on Top (HAT) with an Uninterruptable Power Supply (UPS) according to one or more embodiments of the present disclosure.

FIG. 3 is a simplified block diagram depicting an exemplary RPI Hardware Attached on Top (HAT) 104 with an Uninterruptable Power Supply (UPS) according to one or more embodiments of the present disclosure. It will be appreciated that the RPI HAT 104 shown in FIG. 3 is merely an example and additional/alternative embodiments of the RPI HAT 104 from system 100 are contemplated within the scope of the present disclosure.

As shown, the RPI HAT 104 includes a voltage converter 302 (e.g., 24V to 5V DC-DC converter), super-capacitor (SC) circuitry 304, SC power bank 308, load switch 306, capacitor voltage monitor circuitry 310, OR logic 312 (e.g., an OR logic gate), and RPI HAT interface 314. The SC back-up system 106 (e.g., the LTC 4041 circuitry) from FIG. 1 includes the SC circuitry 304 and the SC power bank 308. The compatibility circuitry 108 from FIG. 1 includes the voltage converter 302, the capacitor voltage monitor circuitry 310 (e.g., voltage comparator), the OR logic 312, the load switch 306, and/or the RPI HAT interface 314. The RPI HAT interface 314 may be an interface between the RPI HAT 104 and the RPI processor 110. For instance, each pin of the RPI HAT interface 314 may have a corresponding pin or slot to the RPI processor 110. As described above and with reference to FIG. 2, while the SC back-up system 106 is known, the use of the SC back-up system 106 as a back-up system for an RPI processor such as the RPI processor 110 is new and due to the difficulties of using the SC back-up system 106 alone, additional compatibility circuitry 108 is included and used to enable the SCs of the SC back-up system 106 to be used as a back-up power supply for the RPI processor 110.

In operation, the voltage converter 302 functions as a first stage step down DC-DC converter allowing the SC back-up system 106 (e.g., LTC4041) to operate from a 24V DC power source 102. In some instances, the output of the voltage converter 302 is set to a certain voltage (e.g., approximately 5.1V DC) and is fed into the input of the SC back-up system 106 (e.g., LTC4041) and in particular, to the SC circuitry 304. The capacitor voltage monitor circuitry 310 is a dual high/low analog voltage comparator that is used to monitor the voltage of the Super-capacitor stack (e.g., the SC power bank 308). The upper and lower threshold voltage detection points of the capacitor voltage monitor circuitry 310 are determined by one or more resistors (e.g., three resistors). Based on signals from the capacitor voltage monitor circuitry 310, the load switch 306 connects and/or disconnects the downstream load (e.g., the RPI processor 110) based on feedback/signals from the capacitor voltage monitor circuitry 310 (e.g., a capacitor full (CAPF) signal) and/or the RPI HAT interface 314 (e.g., an override signal/ general purpose input output pin 22 signal (GPIO22 signal) from the RPI processor 110 via the RPI HAT interface 314). For instance, at start-up and while the SC power bank 308 begins charging, the capacitor voltage monitor circuitry 310 maintains a signal low. The capacitor voltage monitor circuitry 310 provides this signal to the OR logic 312 and the load switch 306. Based on this signal being low, the load switch 306 keeps the RPI processor 110 disconnected from the output of the SC circuitry 304 (e.g., the LTC 4041 output).

In other words, the capacitor voltage monitor circuitry 310, the load switch 306, and/or the OR logic 312 may be a delay circuit. Based on comparing the voltage of the SCs in the SC power bank 308 with a first threshold (e.g., CAPF threshold value), the capacitor voltage monitor circuitry 310 may determine whether to keep a signal (e.g., CAPF signal) low or high. When the signal is low, the capacitor monitor circuitry 310 may provide a signal of a certain voltage to the load switch 306 or not provide a signal to the load switch 306. Similarly, when signal is high, the capacitor monitor circuitry 310 may provide a signal of a different voltage to the load switch 306 (e.g., low signal may be 1V and high signal may be 5V) or actually provide a signal to the load switch 306. When the capacitor monitor circuitry 310 provides a low signal, then the load switch 306 disconnects the output of the SC circuitry 304 to the RPI processor 110. For instance, the load switch 306 prevents the power source 102 from powering the RPI processor 110 when the capacitor monitor circuitry 310 provides the low signal. By disconnecting the output of the SC circuitry 304 to the RPI processor 110 and referring to FIG. 2, the delay circuitry enables the SC Power Bank 308 to charge to a sufficient level (e.g., to the CAPF threshold value).

When the voltage of the SC power bank 308 reaches the upper threshold voltage (CAPF threshold value), the capacitor voltage monitor circuitry 310 provides a high signal, which turns on and activates the load switch 306 and allows the RPI processor 110 to receive power from the power source 102 via the output of the SC circuitry 304. This control mechanism of the CAPF threshold ensures that the SC power bank 308 charging process is not interrupted by the load current drawn by the RPI processor and eliminates any instability in the capacitor charging circuit of the SC back-up system 106.

As soon as the RPI processor 110 receives power, the RPI processor 110 starts to boot up. The boot script (e.g., initialization or start-up script) of the RPI processor 110 may be designed to turn on a feedback pin or feedback signal (e.g., an override signal/general purpose input output pin 22 signal (GPIO22 signal)). The feedback signal may be provided via the RPI hat interface 314 to the OR logic 312 and then to the load switch 306. Additionally, this feedback signal may be provided to the SC circuitry 304. This feedback signal overrides the capacitor voltage monitor circuitry's 310 control over the load switch 306, keeping the power of the RPI processor 110 supply on even if the SC voltage of the SC power bank 308 falls below the upper threshold voltage (e.g., CAPF threshold) of the capacitor voltage monitor circuitry 310. The feedback signal (e.g., GPIO22 signal) is also connected to the SC circuitry 304 and in particular to the backup/boost controller enable (BSTEN) pin of a buck/boost controller that is within the SC circuitry 304. By using this GPIO22 signal from the RPI processor 110, this arms the RPI HAT 104 to activate the buck/boost controller of the SC circuitry 304 if there is a power failure detected. Additionally, during the RPI processor 110 shutdown, when the GPIO22 signal turns off, this cuts power to the RPI processor 110 and allows residual charge to be saved in the SC power bank 308.

In other words, when the RPI processor 110 turns on (e.g., the capacitor voltage monitor circuitry 310 provides a high signal due to the CAPF threshold to the load switch 306 and the load switch 306 enables power to be provided to the RPI processor 110), the RPI processor 110 provides a feedback signal (e.g., the GPIO22 signal) back to the OR logic 312. The OR logic 312 (e.g., an OR logic gate) takes the feedback signal and as long as this feedback signal remains high, the OR logic 312 overrides the signal (e.g., CAPF signal) from the capacitor voltage monitor circuitry 310 such that it is providing a high signal to the load switch 306. As such, the load switch 306 enables the RPI processor 110 to receive power from the power source 102 via the SC circuitry 304 regardless of whether the CAPF signal indicates the voltage from the SC power bank 308 is at the CAPF threshold.

When the supply voltage from the power source 102 is interrupted (e.g., an event indicating a power failure/power loss), a PFO output (pin 14) of the SC circuitry 304 is set to low. This signal is transmitted to the RPI processor 110 via the RPI hat interface 314. This transition prompts the UPS service handler executing on the RPI processor 110 to prepare to shut down the RPI processor 110. However, the service handler waits for the SC voltage of the SC power bank 308 to drop to a second or lower threshold voltage (e.g., a capacitor empty (CAPE) threshold). This lower threshold voltage (e.g., CAPE threshold) is a safety mechanism that ensures that the power interruption is permanent (e.g., for a substantial amount of time) and not a transient glitch (e.g., intermittent). When the SC voltage of the SC power bank 308 reaches the lower threshold voltage, it can sustain the power of the RPI processor 110 for just enough time to shut down gracefully and/or safely. The detection of the lower threshold voltage (CAPE threshold) is transmitted to the RPI processor 110 via the RPI HAT interface 314. At the end of the shutdown sequence, the RPI processor 110 releases the GPIO22 signal to turn off the buck/boost controller, killing power to the RPI processor 110 and preventing further discharge of the SCs of the SC power bank 308. This ensures that the SCs of the SC power bank 308 are not completely depleted, which helps reduce the initial surge current during the next charge cycle.

In other words, when a power loss/failure event occurs, a PFO signal is provided from the SC circuitry 304 to the RPI processor 110 indicating a power loss/failure. However, the RPI processor 110 remains operational as long as the SC power bank 308 maintains a voltage over a second threshold value (e.g., CAPE threshold). The capacitor voltage monitor circuitry 310 monitors the voltage of the SC power bank 308 and when the SCs reach the CAPE threshold, the CAPE signal is provided to the RPI processor 110. Based on both signals (CAPE and PFO signals), the RPI processor 110 initiates the shutdown operation. During the shutdown operation/sequence, the RPI processor 110 releases or turns off/low the GPIO22 signal (e.g., the feedback signal discussed above from the RPI processor 110) that is provided to the load switch 306 and the SC circuitry 304. By releasing or turning off/low the GPIO22 signal, the RPI processor 110 turns itself off as well as preventing further discharge of the SCs of the SC power bank 308.

Additionally, and/or alternatively, in some examples, the RPI HAT 104 also integrates an audible alarm circuit which is activated while the Super-capacitor voltage is below the upper threshold voltage (e.g., CAPF threshold) of the capacitor voltage monitor circuitry 310.

To put it another way, the power source 102 provides power to the voltage converter 302, which converts the power into a voltage usable by the RPI processor 110. The voltage converter 302 provides the output to the SC circuitry 304. The SC circuitry 304 enters a charging mode and charges the SCs of the SC power bank 308. When the SC power bank 308 reaches a first threshold (e.g., CAPF threshold), the capacitor voltage monitor circuitry 310 provides the CAPF signal to the OR logic 312 and the load switch 306. The load switch 306 then enables power to be provided to the RPI processor 110 from the power source 102.

At start-up, the RPI processor 110 provides a feedback signal (e.g., the GPIO22 signal) to the load switch 306. By using the OR logic 312, the GPIO22 signal remaining high overrides the CAPF signal from the capacitor voltage monitor circuitry 310. In other words, the load switch 306 continues enabling the power source 102 and/or the SC power bank 308 to provide power to the RPI processor 110 regardless whether the voltage of the SCs in the power bank 308 drop below the CAPF threshold.

During a power failure event, the PFO signal from the SC circuitry 304 is provided to the RPI processor 110 as well as power from the SC power bank 308. However, instead of shutting down after receiving the PFO signal, the RPI processor 110 remains operational until it receives a second signal, the CAPE signal. The capacitor voltage monitor circuitry 310 monitors the SC power bank 308 and if the voltage of the SCs in the power bank 308 reaches a second threshold (e.g., CAPE threshold), the capacitor voltage monitor circuitry 310 provides the CAPE signal to the RPI processor 110. The RPI processor 110, based on receiving both signals, then initiates a shut-down sequence. During the shut-down sequence, the RPI processor 110 eventually switches the GPIO22 signal that is provided to the load switch 306 and the backup buck/boost controller of the SC circuitry 304 to low. This prevents power from reaching the RPI processor 110 as well as preventing further discharge of the SCs of the SC power bank 308.

Figure 4:
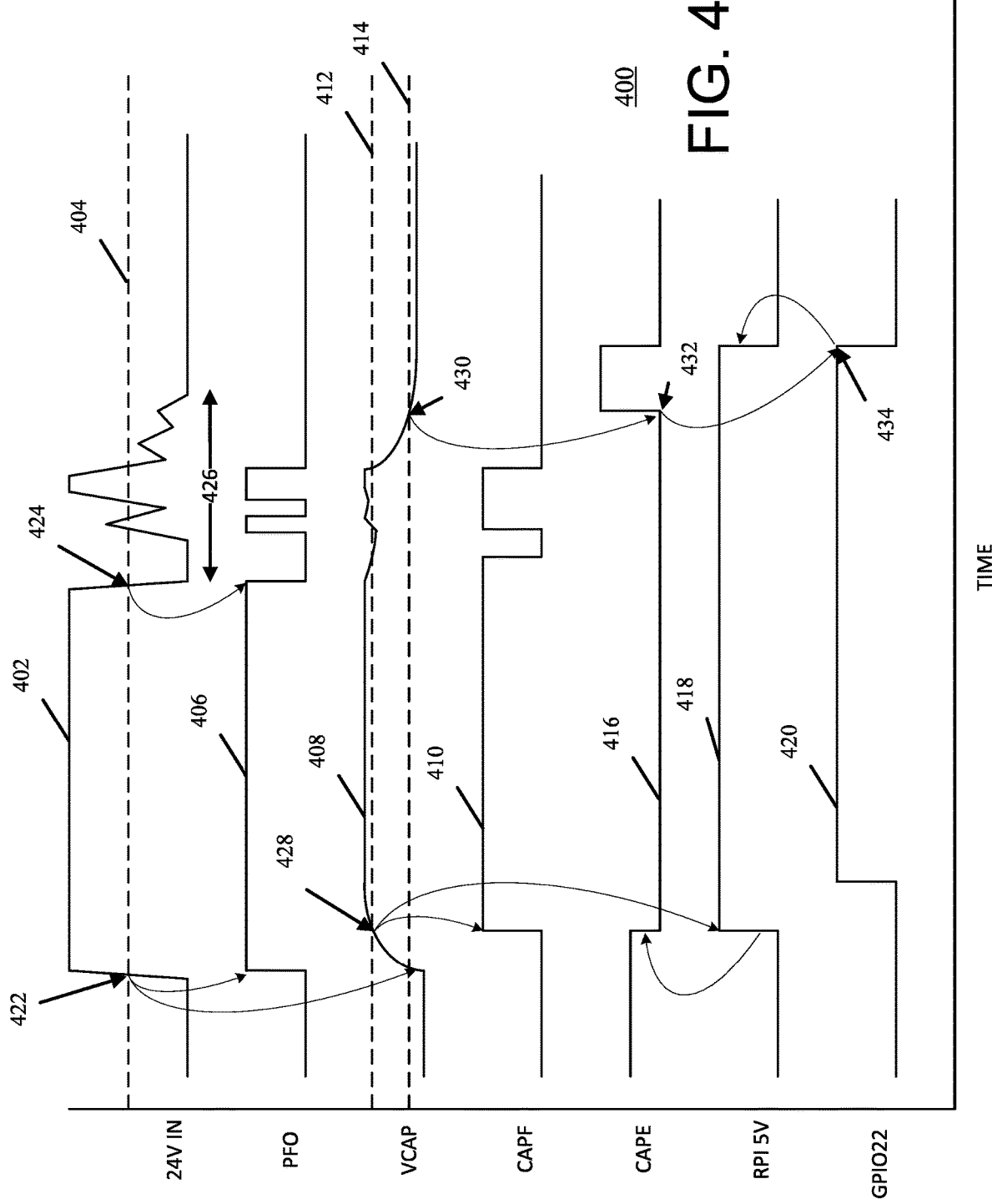
FIG. 4 illustrates a graphical representation of using the RPI HAT with the UPS to provide a back-up power supply to the RPI processor according to one or more embodiments of the present disclosure.

FIG. 4 illustrates a graphical representation of using the RPI HAT with the UPS to provide a back-up power supply to the RPI processor according to one or more embodiments of the present disclosure. In other words, the graphical representations on FIG. 2, the graphical representations of FIG. 4 use the compatibility circuitry 108 such as the load switch 306, the OR logic 312, and the capacitor voltage monitor circuitry 310. The graphical representations of FIG. 4 will be used to describe FIG. 3 in more detail.

As shown, signal 402 represents the signal coming from the power source 102 (e.g., 24V IN signal). The line 404 represents a power fail threshold similar to line 402 from FIG. 2. Signal 406 represents the power fail output (PFO) signal, which is similar to the PFO signal 206 from FIG. 2. When the 24V IN signal 402 is above the threshold 404, the PFO signal 406 is high and when the 24V IN signal 402 is below the threshold 404, the PFO signal 408 is low.

The signal 408 represents the detected voltage (VCAP) at the super capacitors (SCs) of the SC back-up system 106 (e.g., the SCs of the SC power bank 308). Unlike the VCAP signal 208 from FIG. 2 and by using the compatibility circuitry 108, the VCAP signal 408 is able to reach enough charge to be able to provide back-up power to the RPI processor 110 in the event of a power failure/loss event. The VCAP 408 has two different voltage thresholds, which are described above. The CAPF threshold 412 is a higher voltage threshold and is used to initiate and power on the RPI processor 110. The CAPE threshold 414 is a lower voltage threshold and is used to initiate a shut-down sequence for the RPI processor 110.

The CAPF signal 410 indicates when the VCAP signal 408 is above the CAPF threshold 412. For instance, when the VCAP signal 408 (e.g., indicating the charge of the SCs) is above the CAPF threshold 412, the CAPF signal 410 is high. The CAPE signal 416 indicates when the VCAP signal 408 is below the CAPE threshold 414. For instance, when the VCAP signal 408 is below the CAPE threshold 414, the CAPE signal 416 is high and when it is above the CAPE threshold 414, it is low. Alternatively, the CAPE signal 416 is also low once the RPI processor 110 is shut down.

The RPI 5V signal 418 is similar to signal 210 from FIG. 2 that represents the voltage/power received by the RPI processor 110. Unlike FIG. 2 (e.g., not using the compatibility circuitry 108), the RPI 5V signal 418 remains high (e.g., the RPI processor 110 is turned/remains on) even if a power loss/failure event occurs. The GPIO22 signal 420 indicates when the RPI processor 110 is initializes it's boot-up sequence.

In operation, at time 422, similar to time 212 of FIG. 2, the power source 102 provides a voltage (e.g., represented by signal 402) to the RPI HAT 104. The PFO signal 406 is turned high and the VCAP signal 408 indicates that the SCs of the SC power bank 308 begins charging. However, unlike FIG. 2, the RPI 5V signal 418 remains low. In other words, the delay circuitry (e.g., the capacitor voltage monitor circuitry 310, OR logic 312, and/or load switch 306) keeps power from reaching the RPI processor 110. Instead, the delay circuitry allows the SCs of the SC power bank 308 to continue charging.

At time 428, the VCAP signal 408 reaches the CAPF threshold 412, which indicates the SCs of the power bank 308 have charged to a CAPF voltage threshold value. The CAPF signal 410 turns high and this signal is provided to the load switch 306. Based on this, the RPI 5V signal 418 turns high as well and the CAPE signal 416 turns low. In other words, the capacitor voltage monitor circuitry 310 monitors the VCAP signal 408 and upon reaching the CAPF threshold 412, the capacitor voltage monitor circuitry 310 provides a high CAPF signal 410 to the load switch 306. The load switch 306 turns then provides power to the RPI processor 110, which causes the RPI 5V signal 418 to turn high.

At time 424, the 24V IN signal 402 reaches below the threshold 404 indicating a power loss/power failure event. However, as shown by time period 426, the 24V IN signal 402 occasionally rises above the threshold 404 again, which indicates that the power loss is intermittent. Then, after time period 426, the 24V signal 402 remains low indicating the power source 102 is not providing power to the RPI HAT 104 and/or the RPI processor 110. The PFO signal 406 indicates when the 24V IN signal is above the threshold 404. As shown by the VCAP and the CAPF signals 408 and 410, the SCs voltages remain substantially high. Accordingly, the RPI 5V signal 418 remains high indicating that the power source 102 is providing power to the RPI processor 110 and/or the SCs are discharging and providing power to the RPI processor 110. In other words, the RPI processor 110 is still getting the necessary power to remain operational.

At time 430, the VCAP signal 408 reaches the CAPE threshold 414. This causes the CAPE signal 416 at time 432 to become high. In other words, at time 432, the capacitor voltage monitor circuitry 310 detects the voltage of the SC power bank 308 is at the CAPE threshold value. This causes the capacitor voltage monitor circuitry 310 to provide a high CAPE signal 416 to the RPI processor 110 via the RPI HAT interface 314. After receiving the CAPE signal 416 at time 432, the RPI processor 110 begins initializing the shut-down sequence. However, as shown by the RPI 5V signal 418, the RPI processor 110 continues to be supplied power (e.g., from the discharging of the SCs from the power bank 308). Eventually, after ensuring a safe shutdown, the RPI processor 110 turns off or changes the GPIO22 signal to low. This causes the discharge of the SCs of the power bank 308 to stop, which turns the RPI 5V signal 418 and the CAPE signal 416 to low.

Figure 5:
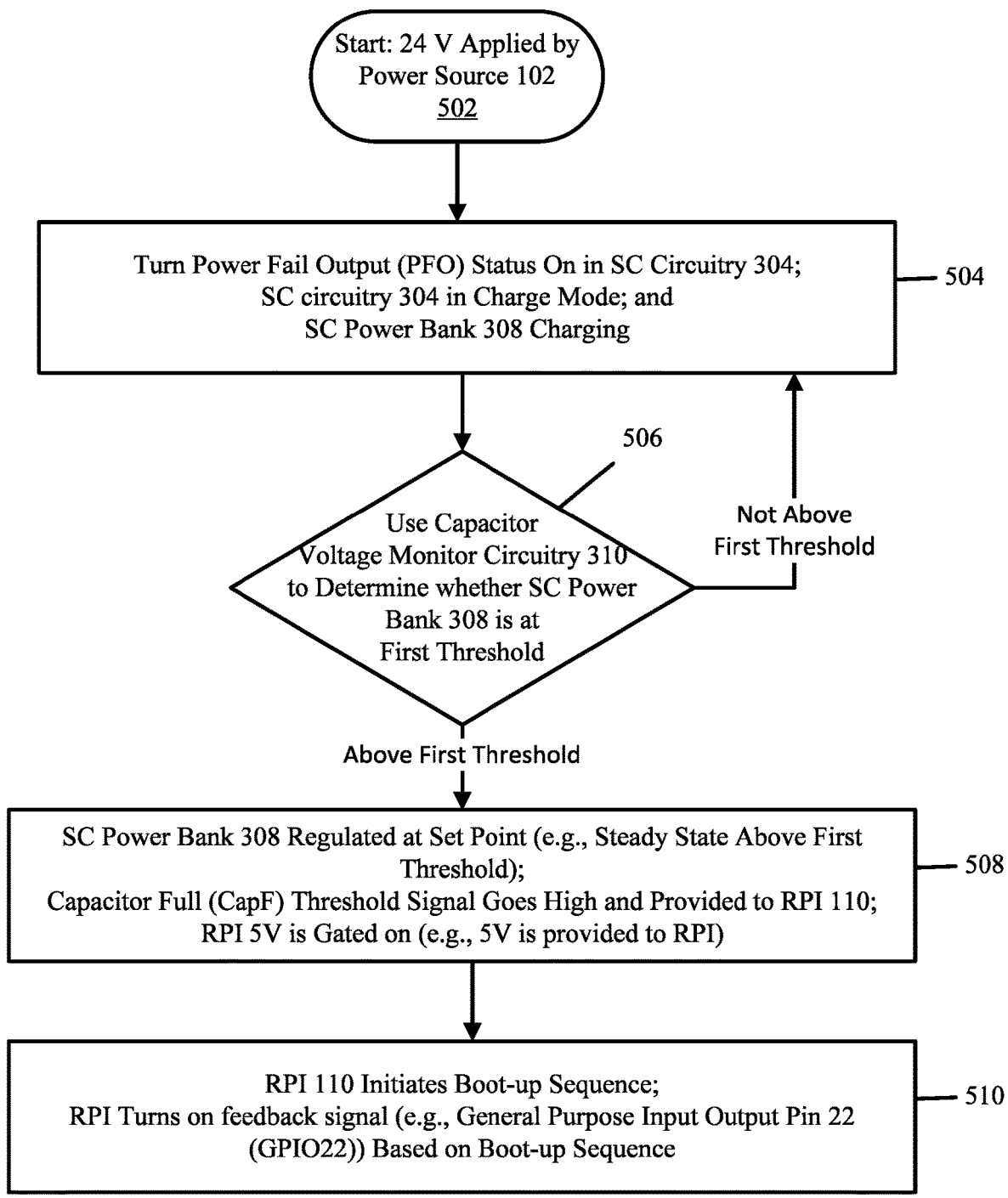
FIG. 5 illustrates a process for operating the RPI HAT to provide the back-up power supply to the RPI processor according to one or more embodiments of the present disclosure.

FIG. 5 illustrates a process 500 for operating the RPI HAT 104 to provide the back-up power supply to the RPI processor 110 according to one or more embodiments of the present disclosure. The process 500 may be performed by the RPI HAT 104 of FIG. 3. However, it will be recognized that any of the following blocks may be performed in any suitable order and that the process 500 may be performed by any suitable RPI HAT 104 that includes compatibility circuitry 108 to enable the SC back-up system 106 to be used as a back-up power supply for the RPI processor 110 in the event of a power failure/loss from the power source 102.

At block 502, the process 500 starts and the power source 102 applies a voltage, current, or power (e.g., 24V) to the RPI HAT 104.

At block 504, based on the power source 102 applying the voltage, current, or power, the SC circuitry 304 turns the power fail output (PFO) status to on (e.g., high). Further, the SC circuitry 304 is in a charge mode and the SC power bank 308 begins charging.

At block 506, the capacitor voltage monitor circuitry 310 is used to determine whether the SC power bank 308 is at a first threshold (e.g., at the CAPF threshold). If it is not above this first threshold, the process 500 moves back to 504 and the SC power bank 308 continues charging. If it is above this first threshold, the process 500 moves to block 508.

At block 508, the SC power bank 308 is regulated at a set point (e.g., a steady state value above the first/CAPF threshold). The CAPF threshold signal (e.g., signal 410) goes high and is provided to the RPI 110. The RPI 5V is gated on (e.g., 5V is provided to the RPI processor 110).

At block 510, the RPI 110 initiates a boot-up sequence. During the boot-up sequence, the RPI 110 turns on the feedback signal (e.g., GPIO22) based on initiating the boot-up sequence.

Figure 6:
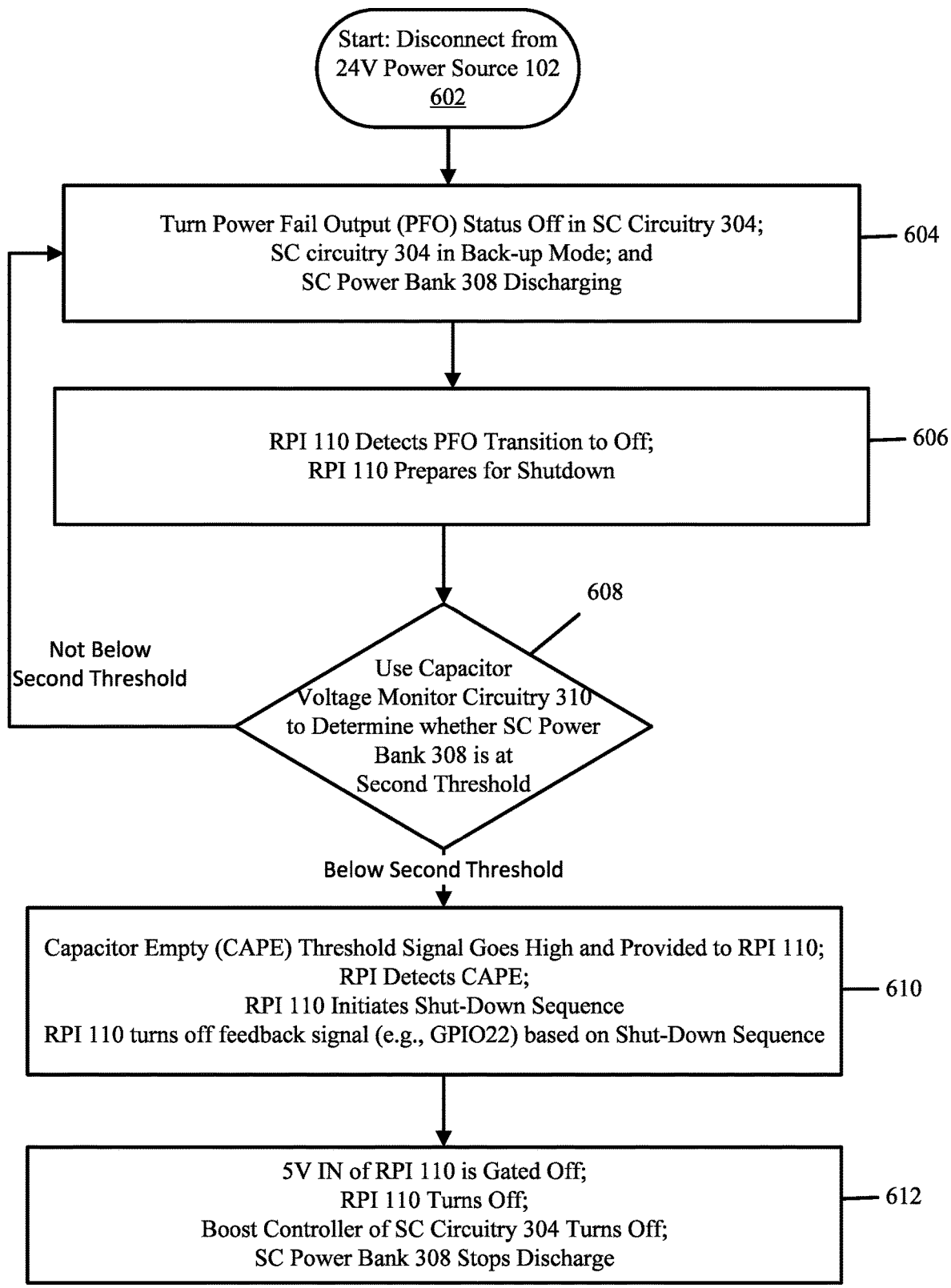
FIG. 6 illustrates another process for operating the RPI HAT to provide the back-up power supply to the RPI processor according to one or more embodiments of the present disclosure.

FIG. 6 illustrates another process 600 for operating the RPI HAT 104 to provide the back-up power supply to the RPI processor 110 according to one or more embodiments of the present disclosure. The process 600 may be performed by the RPI processor 110 and/or the RPI HAT 104 of FIG. 3. However, it will be recognized that any of the following blocks may be performed in any suitable order and that the process 600 may be performed by any suitable processor and/or RPI HAT 104 that includes compatibility circuitry 108 to enable the SC back-up system 106 to be used as a back-up power supply for the processor in the event of a power failure/loss from the power source 102.

At block 602, the process 600 starts due to a disconnect from the 24V power source 102 (e.g., a power loss/failure event).

At block 604, the SC circuitry 304 turns off the PFO status. The SC circuitry 304 is in a back-up mode and the SC power bank 308 begins discharging and providing power to the RPI processor 110.

At block 606, the RPI processor 110 detects the PFO transition to off mode and the RPI 110 prepares for shutdown. While the RPI 110 prepares for shutdown, the RPI 110 is not initiating a shutdown sequence or actually shutting down.

At block 608, the capacitor voltage monitor circuitry 310 determines whether the SC power bank 308 is at a second threshold (e.g., CAPE threshold). If no, the process 600 repeats and the SC power bank 308 continues discharging (e.g., providing power to the RPI processor 110). If yes, the process 600 moves to block 610.

At block 610, the CAPE signal (e.g., signal 416) goes high and is provided to the RPI 110. The RPI 110 detects the CAPE signal, which indicates the charge at the SCs of the power bank 308 is running low (e.g., at the CAPE threshold value). The RPI 110 initiates a shutdown sequence to ensure a safe shutdown. Then, the RPI 110 turns off the feedback signal (e.g., GPIO22) as part of the shut-down sequence.

At block 612, the 5V IN of RPI 110 is gated off and the RPI 110 turns off. The boost controller of the SC circuitry 34 turns off and the SC power bank 308 stops discharging (e.g., providing power to the RPI processor 110).

Figure 7A:
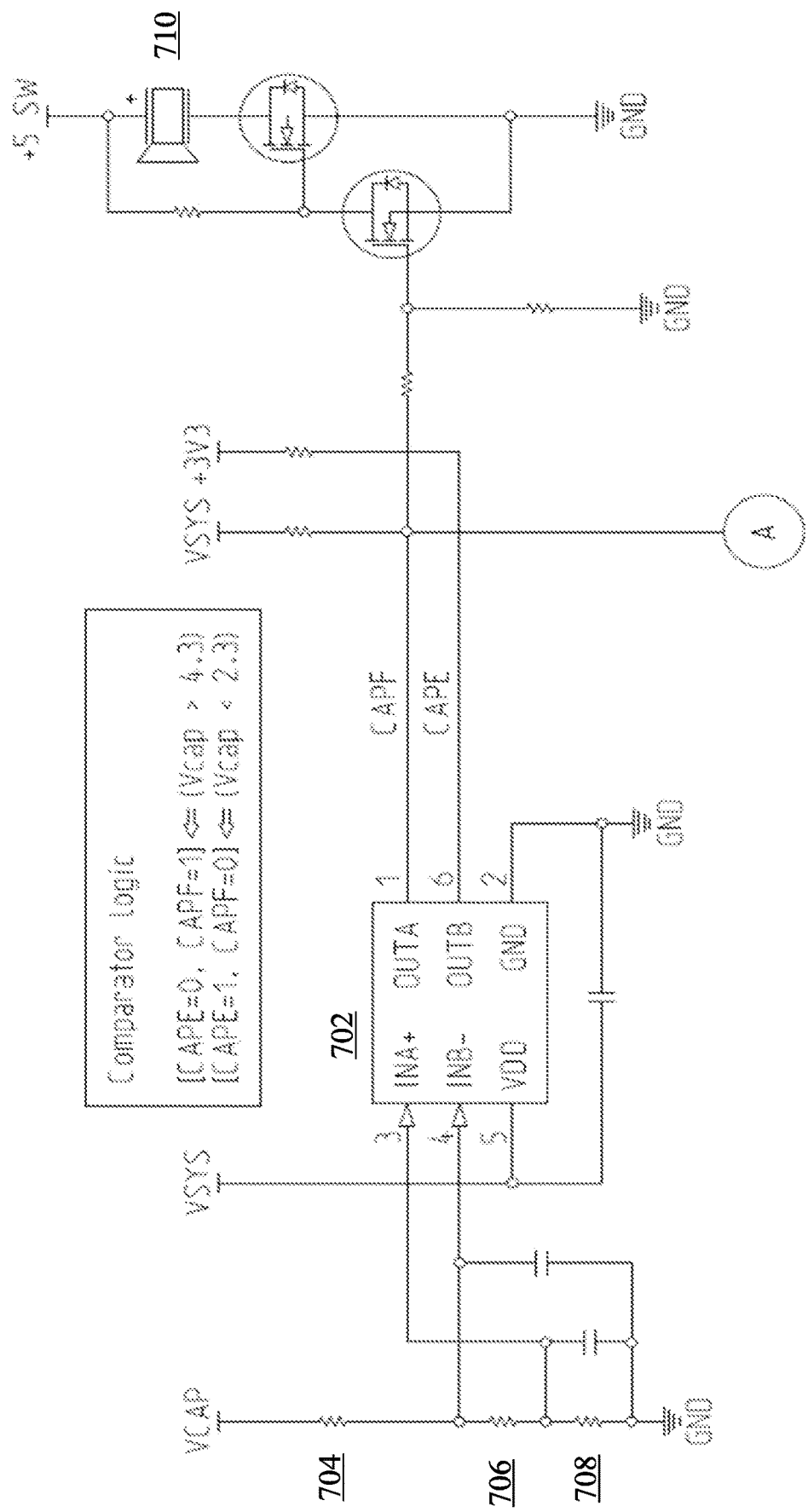
FIGS. 7a and 7b depict an exemplary compatibility circuitry of the RPI HAT according to one or more embodiments the present disclosure.
Figure 7B:
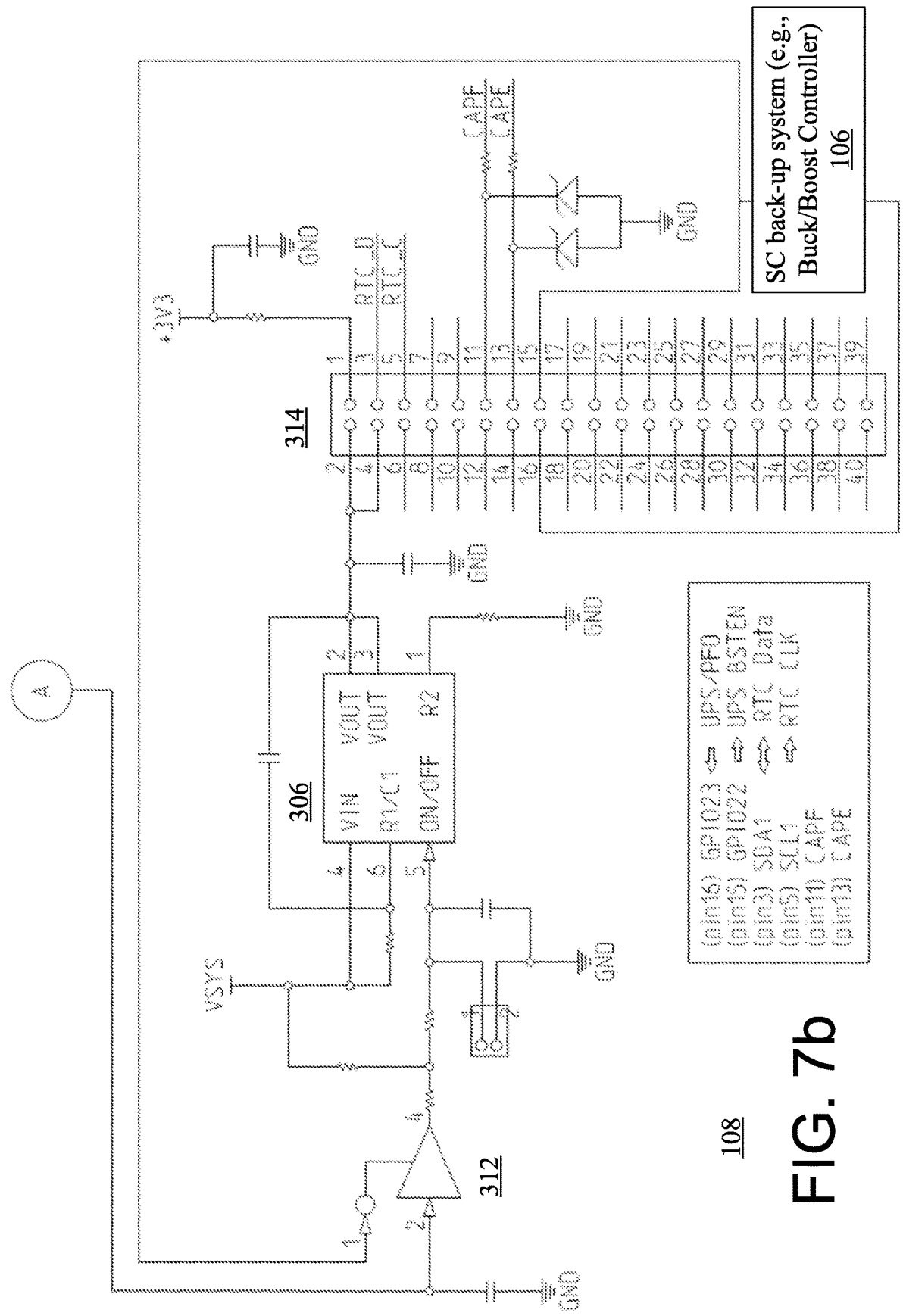

FIGS. 7a and 7b depict an exemplary compatibility circuitry of the RPI HAT according to one or more embodiments the present disclosure. In particular, FIG. 7a depicts an exemplary capacitor voltage monitor circuitry 310. The capacitor voltage monitor circuitry 310 includes a voltage comparator 702 that outputs two signals, the CAPF signal and the CAPE signal. Additionally, the capacitor voltage monitor circuitry 310 includes three resistors 704, 706, 708 used to detect the charge of the SCs of the power bank 308. The capacitor voltage monitor circuitry 310 includes an alarm circuitry 710 used to sound an alarm when the voltage of the SCs of the power bank 308 is below the CAPF threshold as described above.

FIG. 7b depicts additional exemplary compatibility circuitry 108 (e.g., the compatibility circuitry 108 without the capacitor voltage monitor circuitry 310). In particular, the additional compatibility circuitry 108 includes the OR logic 312, the load switch 306, and the RPI header (e.g., RPI HAT interface) 314. As shown, the RPI header 314 includes forty pins that may be electrically coupled to the pins of the RPI processor 110. Pins 15 and 16 (e.g., the PFO signal and the GPIO22 (override signal/feedback signal from the RPI processor 110)) may be connected to the SC back-up system 106 (e.g., the buck/boost controller). For example, as described above, pin 15 may be the B STEN signal/GPIO22 signal that is provided from the RPI processor 110 to the SC back-up system 106 and the OR logic 312/load switch 306. Further, pin 3 may be a real time clock (RTC) data signal and pin 5 may be an RTC clock signal.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A Hardware Attached on Top (HAT) with an Uninterruptable Power Supply (UPS), wherein the HAT comprises:
   a super-capacitor (SC) back-up system comprising an SC power bank, wherein the SC back-up system is electrically coupled to a power source such that the power source is capable of charging the SC power bank, wherein the SC power bank is configured to discharge and provide power to a computing device in response to a loss of power from the power source to the computing device;
   a delay circuit operatively coupled to the SC back-up system and the computing device such that the delay circuit is configured to monitor a charge of the SC power bank and delay the power source from providing power to the computing device to initiate a Boot-Up Sequence of the computing device until the charge of the SC power bank is above a first threshold; and
   a load switch and a backup Buck/Boost controller,
   wherein the HAT is configured to:
      provide a power failure output (PFO) signal to the computing device, wherein the computing device maintains operation based on receiving the PFO signal;
      provide a capacitor empty (CAPE) signal to the computing device, wherein the computing device initiates a safe shut-down sequence based on receiving the PFO signal and the CAPE signal;
      provide, to the computing device, a capacitor full (CAPF) signal indicating a charge of the SC power bank;
      receive, from the computing device, an override signal configured to override the CAPF signal, wherein receiving the override signal comprises the load switch and the backup Buck/Boost controller receiving the override signal; and
      based on the computing device ceasing to provide the override signal to the HAT, shut off power to the computing device and prevent further discharge of power from the SC power bank.

2. The HAT of claim 1, wherein the delay circuit comprises:
   a voltage comparator operatively coupled to the SC power bank and configured to:
   compare the charge of the SC power bank with the first threshold; and
   based on the charge of the SC power bank being above or at the first threshold,
   provide a signal to the load switch indicating the SC power bank is above or at the first threshold.

3. The HAT of claim 2, wherein the voltage comparator comprises a plurality of resistors.

4. The HAT of claim 2, wherein the delay circuit further comprises:

the load switch operatively coupled to the voltage comparator and the computing device, wherein the load switch is configured to:

block the power source from providing the power to the computing device; and in response to obtaining, from the voltage comparator, the signal associated with the first threshold, provide the power from the power source to the computing device to initiate start-up operations for the computing device.

5. The HAT of claim 4, wherein the voltage comparator is further configured to provide the signal to the computing device, and wherein the signal is a capacitor full (CAPF) signal indicating the SC power bank is at or above the first threshold.

6. The HAT of claim 1, wherein the HAT further comprises an OR logic gate, wherein the override signal and the CAPF signal are provided as inputs to the OR logic gate and an output of the OR logic gate is coupled to the load switch, and wherein the OR logic gate is used to override the CAPF signal and maintain power from the power source to the computing device based on the override signal.

7. The HAT of claim 1, wherein the SC back-up system comprises:

SC circuitry, wherein the SC circuitry is configured to provide the PFO signal to the computing device, wherein the PFO signal indicates a power loss or failure event occurring, and wherein the computing device remains operational based on receiving only the PFO signal.

8. The HAT of claim 7, wherein the delay circuit comprises:

a voltage comparator operatively coupled to the SC power bank and configured to:

compare the charge of the SC power bank with a second threshold, and wherein providing the CAPE signal to the computing device comprises providing, by the voltage comparator, the CAPE signal to the computing device based on the charge of the SC power bank reaching the second threshold.

9. The HAT of claim 8, wherein the second threshold is below the first threshold.

10. The HAT of claim 7, wherein the HAT further comprises a voltage converter, wherein the voltage converter is coupled to the SC circuitry.

11. The HAT of claim 10, wherein the SC circuitry comprises a power fail detector configured to detect an occurrence of the power loss or failure event.

12. The HAT of claim 11, wherein the SC circuitry further comprises an SC charge regulator.

13. The HAT of claim 1, further comprising a HAT interface, wherein the HAT interface is an interface between the HAT and the computing device.

14. The HAT of claim 13, wherein the HAT interface comprises a plurality of pins that each have a corresponding pin on the computing device.

15. The HAT of claim 1, further comprising an audible alarm circuit, wherein the audible alarm circuit is configured to provide an alarm based on a voltage of the SC power bank being below the first threshold.

* * * * *